(12) United States Patent
Jennen et al.

(10) Patent No.: US 7,311,524 B2
(45) Date of Patent: Dec. 25, 2007

(54) SYSTEM AND METHOD ASSESSING STUDENT ACHIEVEMENT

(75) Inventors: Steven R. Jennen, Bloomington, MN (US); Gary A. Germann, Sandstone, MN (US)

(73) Assignee: Harcourt Assessment, Inc., San Antonio, TX (US)

( * ) Notice: Subject to any disclaimer, the term of this patent is extended or adjusted under 35 U.S.C. 154(b) by 762 days.

(21) Appl. No.: 10/346,941

(22) Filed: Jan. 17, 2003

(65) Prior Publication Data

US 2003/0134261 A1 Jul. 17, 2003

Related U.S. Application Data

(60) Provisional application No. 60/350,198, filed on Jan. 17, 2002.

(51) Int. Cl.
*G09B 3/00* (2006.01)
(52) U.S. Cl. .............. 434/323; 434/118; 434/350
(58) Field of Classification Search ............ 434/118, 434/323, 350, 365
See application file for complete search history.

(56) References Cited

U.S. PATENT DOCUMENTS

| | | | | |
|---|---|---|---|---|
| 5,820,386 | A * | 10/1998 | Sheppard, II | 434/322 |
| 6,064,856 | A * | 5/2000 | Lee et al. | 434/350 |
| 6,112,049 | A * | 8/2000 | Sonnenfeld | 434/350 |
| 6,299,452 | B1 * | 10/2001 | Wasowicz et al. | 434/178 |
| 6,431,875 | B1 * | 8/2002 | Elliott et al. | 434/322 |
| 6,652,287 | B1 * | 11/2003 | Strub et al. | 434/365 |
| 6,960,088 | B1 * | 11/2005 | Long | 434/322 |
| 2002/0156632 | A1 * | 10/2002 | Haynes et al. | 704/270 |
| 2003/0113697 | A1 * | 6/2003 | Plescia | 434/322 |

* cited by examiner

*Primary Examiner*—Robert E. Pezzuto
*Assistant Examiner*—Alex R. R. P. Rada, II
(74) *Attorney, Agent, or Firm*—Larkin Hoffman Daly & Lindgren Ltd.; Thomas J. Oppold

(57) ABSTRACT

A system and method for assessing and monitoring student academic achievement levels for purposes of identifying students at risk for not meeting minimum academic standards as measured using standardized tests, and for tracking or monitoring student academic performance levels. The system and method of the present invention comprises producing a pool of curriculum-independent General Outcome Measures (GOMs) of substantially equal difficulty for a particular grade level, and further comprises a system and method of assessing and monitoring students in that grade level using the pool of GOMs for the purpose of identifying those students at risk for not meeting minimum standardized test target scores and for tracking or monitoring student academic performance levels. The system comprises a database accessible remotely by authorized users through a network and user interface in which authorized users can remotely input student academic performance information and selectively retrieve that information for display through the user interface.

54 Claims, 27 Drawing Sheets

*60*

| | | | Tuesday, January 7, 2003 | ? help |
|---|---|---|---|---|
| Martha Washington (training) | | | United States School District | |

| Navigator | Manager Menu | |
|---|---|---|
| District<br>Add a District<br>School<br>Select a District first<br>School Year<br>2002-2003<br>Benchmark Period<br>Fall<br>General Outcome Measure<br>Reading - Standard Benchmark<br>Passages<br>[Home] [Reports] [Logout] | Manage<br>• Districts<br>• Schools<br>   Select a District<br>• Teachers<br>• Students<br>• Classes<br>• Users<br>• School Benchmark Targets<br>   Select a District<br>• Benchmark Target Templates<br>• GOMS | Enter/Edit<br>• Student Scores<br>   Select a District<br>• Standard Test Scores<br>   Select a District<br><br>Downloads<br>• Training Materials<br>• Benchmark Passage(s)<br>• Progress Monitor Passage(s) |

Manage Districts

| ID | Name | Action |
|---|---|---|
| 148 | Washington School Disctrict | Edit  Delete  Select  Add User |

Name: [ *School District* ]

Name Abbreviation [ *ASD* ]

[Add] [Cancel]

Fig. 5

Manage Schools

| ID | Name | Grades Served | Action |
|---|---|---|---|
| 319 | Adams Elementary School | K-6 | Edit   Delete   Select   Add User |
| 320 | Jefferson Elementary School | K-6 | Edit   Delete   Select   Add User |

Name: *Madison Middle School*

Name Abbreviation *MMS*

Grades Served:

☐K   ☐1   ☐2   ☐3   ☐4   ☐5   ☐6
☑7   ☑8   ☐9   ☐10   ☐11   ☐12

Add   Cancel

Fig. 6

Manage Teachers

Add Users for All Teachers

| ID | Last Name | First Name | User (click to modify) | Action |
|---|---|---|---|---|
| 3406 | Monroe | Mr. | Add | Edit  Delete |
| 3407 | Van Buren | Mrs. | Add | Edit  Delete |

First Name: *Mr.*

Middle Name:

Last Name: *Harrison*

Title:

Phone:

Email:

Add  Cancel

Fig. 7

Manage Teacher User

Teacher ID: 3406

User Type: | Regular Teacher ▼ |

Username: (case-sensitive) | MMonroe90 |

Email address: | support@ |

Password: (case-sensitive) | | *will auto-generate if not specified*

Retype Password: (case-sensitive) | | *will auto-generate if not specified*

☑ Email Password to User

First Name: | Mr. |

Last Name: | Monroe |

Fig. 8

Manage Students

Enter student information below and select 'Add' to add the student, or select 'Search' to search for students matching the specified criteria.

Fields in Red are required for adding students.

First Name:          Middle Name:    Last Name:

Service Code: [ ▼ ]          Current Grade: [ ▼ ]

Gender: [ Unknown ▼ ]          Enrollment Grade: [ ]

Meal Status: [ ▼ ]          Date of birth: [ ]

Ethnicity: [ Unknown ▼ ]          Research ID: [ ]

Unique Identifier: [ ]

Non-searchable fields

IDEA: ☐   ESL: ☐   Section 504: ☐   Gifted/Talented: ☐

Behavioral Disorder: ☐   Correctional: ☐     After School: ☐   Summer School: ☐

Transfer ID: [ ]    Enter the Transfer ID and select 'Search' to display the student to transfer.

[ Add ] [ Search ] [ Clear ] [ Cancel ]

Fig. 9

Manage Students

Name: Student, AIMSweb

Service Code: Regular Ed       Current Grade: 2

Gender: Unknown                Enrollment Grade:

Ethnicity: Unknown             Date of Birth:

| GOM | Grade | Period | Data 1 | Data 2 | Service Code | Meal Status | Section 504 | Gifted/Talented | Behavioral Disorder | Correctional | After School | Summer School | IDEA | ESL |
|---|---|---|---|---|---|---|---|---|---|---|---|---|---|---|
| RSBP | 2 | Spring | 80.0 | | Regular Ed ▼ | None ▼ | ☐ | ☐ | ☐ | ☐ | ☐ | ☐ | ☐ | ☐ |
| RSBP | 2 | Winter | 76.0 | | Regular Ed ▼ | None ▼ | ☐ | ☐ | ☐ | ☐ | ☐ | ☐ | ☐ | ☐ |
| RSBP | 2 | Fall | 76.0 | | Regular Ed ▼ | None ▼ | ☐ | ☐ | ☐ | ☐ | ☐ | ☐ | ☐ | ☐ |
| RSBP | 1 | Spring | 93.0 | | Regular Ed ▼ | None ▼ | ☐ | ☐ | ☐ | ☐ | ☐ | ☐ | ☐ | ☐ |
| RSBP | 1 | Winter | 42.0 | | Regular Ed ▼ | None ▼ | ☐ | ☐ | ☐ | ☐ | ☐ | ☐ | ☐ | ☐ |

[Save] [Cancel]

Fig. 10

Manage Classes

Grade: K  1  2  3  4  5

Grade 2 Classes

| ID | Teacher ID | Teacher Name | Action |
|---|---|---|---|
| 661 | 259 | Monroe, Mr. | Edit Roster  Delete Class |
| 685 | 273 | Van Buren, Mrs. | Edit Roster  Delete Class |
| 718 | 293 | Harrison, Mr. | Edit Roster  Delete Class |

To add a teacher class for the selected grade click on 'Add Class':

| ID | Last Name | First Name | Action |
|---|---|---|---|
| 257 | Adams | Ms. | Add Class |
| 258 | Jackson | Mr. | Add Class |
| 260 | Tyler | Mrs. | Add Class |

Cancel

Fig. 11

Manage Roster

Teacher: Mr. Monroe  
Grade: 2

School: Adams Elementary School  
Year: 2002-2003

Class Roster

| ☐ | Student ID | Student Name | Current Grade |
|---|---|---|---|
| | | Move   Remove | |

Select Students to enroll in this class:

| Grade: | K | 1 | 2 | 3 | 4 | 5 |

| Select: | A | B | C | D | E | F | G | H | I | J | K | L | M |
| | N | O | P | Q | R | S | T | U | V | W | X | Y | Z | All |

| ☐ | ID | Last Name | First Name | Grade |
|---|---|---|---|---|
| ☐ | 6680 | Beck | Collin | 2 |
| ☐ | 7157 | Bender | Ryan | 2 |
| ☐ | 6693 | Benson | Cammy | 2 |
| ☐ | 7171 | Bittner | Samuel | 2 |
| ☐ | 6533 | Borren | Anthony | 2 |
| ☐ | 7117 | Bunt | Nicole | 2 |

Add

Cancel

Enter Student Benchmark Data
Reading - Standard Benchmark Passages
Hoover, Mr. (6th Grade)
Fall 2002-2003

Use Long Form

| ID | Students | Corrects | Errors | Actions |
|---|---|---|---|---|
| 6824 | Bonds, Emily | | | Edit Teacher Comments |
| 6908 | Davis, John | | | Edit Teacher Comments |
| 6717 | Fox, Ann | | | Edit Teacher Comments |
| 6903 | Hansen, Steve | | | Edit Teacher Comments |
| 6793 | Johnson, Dave | | | Edit Teacher Comments |
| | | | | Add New Student<br>Add Existing Student |

Save   Cancel

Enter Standard Test Data

Adams Elementary School
Grade 3 Minnesota Comprehensive Assessment Scores
for the 2002-2003 School Year

Use Long Form

Test Date        <<First  <Prev 1-0 of 0 Next>  Last>>

| ID | Students | Mathematics<br>Scale Score | Reading<br>Scale Score |
|---|---|---|---|

<<First  <Prev 1-0 of 0 Next>  Last>>

Students Per Page: 30

Save   Cancel

Fig. 14

○ Below   ○ Above   ⊙ Above & Below Target
☑ Show Target

Class Distribution by Scores and Percentile

Dover School District - Hayes Elementary
(C. Manis) Winter 2001-2002
Reading - Standard Benchmark Passages

| Name | Corrects | Errors | Accuracy | Performance Summary | Potential Instructional Action |
|---|---|---|---|---|---|
| Giancana, P. | 194 | 0 | 100% | Well Above Average | Consider Need for Individualized Instruction |
| Mitchell, N. | 186 | 0 | 100% | Well Above Average | Consider Need for Individualized Instruction |
| 50th %ile = 161 ||||||
| Lollar, L. | 155 | 0 | 100% | Above Average | Consider Need for Individualized Instruction |
| Edit, O. | 152 | 0 | 100% | Above Average | Consider Need for Individualized Instruction |
| 75th %ile = 134 ||||||
| Ludlow, E. | 124 | 0 | 100% | Average | Continue Current Program |
| Shobwell, T. | 108 | 0 | 100% | Average | Continue Current Program |
| Gleason, P. | 107 | 0 | 100% | Average | Continue Current Program |
| Target = 75 ||||||
| 25th %ile = 84 ||||||
| Smiley, N. | 66 | 0 | 100% | Below Average | Further Assess and Consider Individual Program |
| 100th %ile = 57 ||||||
| Pleak, G. | 51 | 0 | 100% | Well Below Average | Begin Immediate Problem Solving |

| Fall | Winter | Spring |
|---|---|---|

Fig. 22

Progress Monitor Assessment Schedule

Adams, Sam
Reading - Standard Benchmark Passages

| Beginning Date | Ending Date | Goal Corrects | Goal Errors | Assess. Grade | Sessions Done | Sessions Total | Actions |
|---|---|---|---|---|---|---|---|
| No Assessment Schedules. | | | | | | | |

Assessment Schedule Wizard

| Schedule | Frequency | SLA | Baseline | Goal |
|---|---|---|---|---|

Daily: ○ every [1] day(s)

Weekly: ⦿ every [1] week(s) on
☐ Mon ☑ Tue ☐ Wed ☐ Thu ☐ Fri

Monthly by Day: ○ The [1st ▼] (or the first day before) of every [1 ▼] month(s)

Monthly by Week: ○ The [First ▼] [Mon ▼] of every [1 ▼] month(s)

Step 2 of 5

[Back] [Next] [Cancel]

Progress Monitor Assessment Schedule

Adams, Sam
Reading - Standard Benchmark Passages

| Beginning Date | Ending Date | Goal Corrects | Goal Errors | Assess. Grade | Sessions | | Actions |
|---|---|---|---|---|---|---|---|
| | | | | | Done | Total | |

No Assessment Schedules.

Assessment Schedule Wizard

| Schedule | Frequency | SLA | Baseline | Goal |
|---|---|---|---|---|

Survey Level Assessment

| Grade: | Corrects | Errors |
|---|---|---|
| Grade 5: | 48 | 17 |
| Grade 4: | 74 | 12 |
| Grade 3: | 101 | 9 |
| Grade 2: | | |
| Grade 1: | | |

[Show Graph]

Assessment Grade Level

Grade Level: [4▼] The grade level for Reading Passage(s) used.

Step 3 of 5

[Back] [Next] [Cancel]

Fig. 25

Progress Monitor Assessment Schedule

Adams, Sam
Reading - Standard Benchmark Passages

| Beginning Date | Ending Date | Goal Corrects | Goal Errors | Assess. Grade | Sessions | | Actions |
|---|---|---|---|---|---|---|---|
| | | | | | Done | Total | |
| No Assessment Schedules. | | | | | | | |

Assessment Schedule Wizard

| Schedule | Frequency | SLA | Baseline | Goal |
|---|---|---|---|---|

Baseline Session Date: 08/26/2002

Baseline Corrects: `74`    Errors: `12`

Baseline Reading Passage: `4P14` ▼

Baseline Graph Label: [          ]

Baseline Note:

```
These are the notes for the
Student's first Progress
Monitor Assessment.
```

Step 4 of 5

[ Back ] [ Next ] [ Cancel ]

Fig. 26

┌─────────────────────────────────────────────────────────────┐
│ Progress Monitor Assessment Schedule                    │
│                                                             │
│                     Adams, Sam                              │
│           Reading - Standard Benchmark Passages             │
│                                                             │
│ | Beginning | Ending | Goal     | Goal   | Assess. | Sessions      | Actions |
│ | Date      | Date   | Corrects | Errors | Grade   | Done | Total  |         |
│ | No Assessment Schedules.                                  │
│                                                             │
│              Assessment Schedule Wizard                 │
│                                                             │
│ | Schedule | Frequency | SLA | Baseline | Goal |            │
│                                                             │
│     Initial Goal Date: 04/25/2003                       │
│                                                             │
│     Goal Corrects: [140]    Errors: [5]                     │
│                                                             │
│                                            Step 5 of 5      │
│                                                             │
│     [Back] [Add] [Cancel]                                   │
└─────────────────────────────────────────────────────────────┘

Fig. 27

Progress Monitor Assessment Schedule

My Assessment Schedule

Adams, Sam

08/26/2002 Schedule — Weekly Session(s)

| Sched. Date | Date Given | Miss | Passage | Corrects | Errors | Actions |
|---|---|---|---|---|---|---|
| 08/26/2002 | 08/26/2002 | ☐ | 4P14 ▼ | 74.0 | 12.0 | Edit Goal |
| 08/27/2002 | 08/27/2002 | ☐ | 4P11 ▼ | 69.0 | 13.0 | New Goal / Add Note |
| 09/03/2002 | 09/03/2002 | ☑ | 4P25 ▼ | | | Add Note |
| 09/10/2002 | 09/10/2002 | ☐ | 4P16 ▼ | 76.0 | 9.0 | New Goal / Add Note |
| 09/17/2002 | 09/17/2002 | ☐ | 4P31 ▼ | | | Add Note |
| 09/24/2002 | 09/24/2002 | ☐ | 4P33 ▼ | | | Add Note |
| 10/01/2002 | 10/01/2002 | ☐ | 4P27 ▼ | | | Add Note |
| 10/08/2002 | 10/08/2002 | ☐ | 4P19 ▼ | | | Add Note |
| 10/15/2002 | 10/15/2002 | ☐ | 4P20 ▼ | | | Add Note |

Gray sessions are baseline/goal sessions. Yellow sessions have corresponding program notes.

Save  Cancel

Fig. 28

SYSTEM AND METHOD ASSESSING STUDENT ACHIEVEMENT

BACKGROUND OF THE INVENTION

1. Field of the Invention

The present invention relates generally to the field of student academic assessment and more particularly to a system and method for assessing and monitoring student academic achievement for purposes of identifying students at risk for not meeting predetermined minimum academic standards or targets.

2. Description of the Related Art

Comprehensive standardized tests have long been used for assessing student academic achievement or aptitude. Such standardized tests include, for example, the Minnesota Comprehensive Assessment (MCA) test and the Iowa Test of Basic Skills (ITBS). These and similar standardized tests are used to test a student's reading comprehension, writing, math and science skills. Educational entities use the students' scores from such standardized tests for comparison against predetermined minimum standards or targets set by the school, the school district, or federal or state agencies, in determining, for example, whether the student should move to the next grade level or whether the student should be retained or required to go to summer school or for purposes of determining whether the student is eligible for a special program.

In addition, standardized tests are used by educational entities and state and federal agencies for comparing academic performance between schools and school districts, for comparing academic performance of students among the different states of the union and for other types of demographic analysis. For example, the reading portion of the MCA test is well suited to provide a picture of a student's general reading skills at one place in time compared to other students in the school district, in the state, or in the country. When students are sampled appropriately, the MCA test allows school-to-school, school-to-state, and even state-to-state comparisons.

Standardized tests are typically given at the end of the school year, and the results are not usually received until well after the school year. Thus, this "after-the-fact" assessment information is not particularly useful to educators to inform instruction.

On Jan. 8, 2002, President Bush signed into law the No Child Left Behind Act of 2001 (NCLB) amending the Elementary and Secondary Education Act (ESEA) enacted in 1965. As published by the Department of Education, on its Internet web site "[The NCLB Act] changes the federal government's role in kindergarten-through-grade-12 education by asking America's schools to describe their success in terms of what each student accomplishes. The act contains the President's four basic education reform principles: stronger accountability for results, increased flexibility and local control, expanded options for parents, and an emphasis on teaching methods that have been proven to work."

Under the NCLB Act, "an 'accountable' education system involves the following steps: [1] The states create their own standards for what a child should know and learn for all grades. Standards must be developed in math and reading immediately. Standards must also be developed for science by the 2005-06 school year; [2] With standards in place, states must test every student's progress toward those standards by using tests that are aligned with the standards. Beginning in the 2002-03 school year, schools must administer tests in each of three grade spans: grades 3-5, grades 6-9, and grades 10-12 in all schools. Beginning in the 2005-06 school year, tests must be administered every year in grades 3 through 8 in math and reading. Beginning in the 2007-08 school year, science achievement must also be tested; [3] Each state, school district, and school will be expected to make adequate yearly progress toward meeting state standards. This progress will be measured for all students by sorting test results for students who are economically disadvantaged, from racial or ethnic minority groups, have disabilities, or have limited English proficiency; 4School and district performance will be publicly reported in district and state report cards. Individual school results will be on the district report cards; [5] If the district or school continually fails to make adequate progress toward the standards, then they will be held accountable."

With respect to school accountability, under the NCLB Act, "parents with a child enrolled in a school identified as in need of improvement for failing to meet the performance standards set by the state will be able to transfer their child to a beffer performing public school or public charter school. Additionally, for the first time, parents with children in a school identified as in need of improvement will be able to use federal education funds for what are called 'supplemental education services.' Those services include tutoring, after school services, and summer school programs." Id.

As a result of the NCLB Act, schools and school districts, now more than ever, are in need of an accurate, low-cost system that will allow them to assess individual students in order to identify which students are at risk for not meeting the state's minimum standards or targets for the state's particular standardized tests. By accurately identifying students at risk for failing the standardized tests, special attention may be given to those students to improve their individual academic performance in order to ensure that the school or school district meets the NCLB requirements, thereby avoiding the loss of students to other schools and increased federal or state scrutiny.

In addition to the need for an assessment program to ensure that schools meet the state's minimum standards or targets, it should be appreciated that schools now have a stronger incentive to not only meet, but exceed these minimum standards. For schools that can demonstrate that they provide higher quality education, they will be able to attract more students and will therefore obtain more federal and state funding. For similar reasons, private schools will also benefit from such an assessment system and method which can be used to demonstrate high academic achievement of its students. Parents wishing to send their students to private schools will naturally choose those private schools with high college placement and good academic reputations in order to ensure their children are provided with a quality education. Accordingly, there is a need in both the private and public educational systems for a low-cost accurate system and method for assessing and reporting a school's or school district's student achievement levels.

Related to the above needs, there is also a need to be able to monitor student achievement and cross-referencing such student achievement data with other important factors, such as the type of curriculum used, the teaching style used and which teachers have the greatest or least number of at risk-students. By cross-referencing such data on an individual and aggregate basis, parents, teachers, principles, superintendents and school boards will be able to more accurately determine which types of programs work more effectively than others or whether poor student achievement may perhaps lie with a particular curriculum, teacher or teaching style. Armed with such accurate and documented evidence, parents, teachers, schools, school districts, school boards and others having an interest in improving academic standards on a local, state or national level will be able to more accurately identify which teachers, which curriculums and which teaching styles provide better results than others. Appropriate corrective action may therefore be taken. Additionally, for teachers who have a demonstrated higher student achievement record, reward or incentive programs may be instituted in order to retain the best teachers and curriculums to continually improving the educational entity's overall student academic performance.

As identified above, under current practices most educational entities are only able to assess a student's academic performance after the student takes the standardized test. This after-the-fact assessment is of little use since it does not enable the educational entity to identify students at risk for failing the standardized tests beforehand so that specialized attention may be provided to those at-risk students. This inability to identify students for early intervention not only harms the student who may otherwise have benefited from early intervention, but it places the school at risk of losing students to better performing schools and being subject to state and federal scrutiny.

While certain educational entities may have the capability to develop their own internal assessment program to identify at-risk students, most educational entities do not have the available resources to do so, either financially or through qualified personnel. Furthermore even if resources were available to develop an internal assessment program, the results of such an internal assessment program may be of limited benefit and short lived unless the educational entity is devoted to implementing continual training of new assessors and continually updating and improving its assessment program.

There are a number of factors that effect the ability to implement a sound and accurate assessment program for use by different educational entities. First, the assessment system and method should be accurate in identifying those students at risk by providing a strong correlation between performance on the assessment tests and performance on the standardized tests used by the educational entity. Second in order for an educational entity on a limited budget to afford to implement an ongoing assessment program, the system and method should be low cost and require minimal training of the assessors. Third, the assessment program should employ assessment tests and grading methods that are "standard" among all users of the system in order to obtain accurate comparisons of the results between different students, classes, schools, and school districts. Fourth, the assessment tests should be "generic" or curriculum independent in order to obtain an accurate picture between classes, schools and school districts that may be employing different curriculums or different instructional materials for teaching their students. Fifth, there should be sufficient assessment tests within a grade-level of substantially equal difficulty for testing the students on an on-going basis without the student repeating the same assessment test. Finally, the assessment tests given to the students should be of short duration to minimize interruption and time away from class.

Accordingly, there is a need for an assessment system and method for use by educational entities which satisfies the foregoing factors while also satisfying the requirements of the NCLB Act or similar requirements and for meeting the high education standards parents properly expect from their children's schools.

SUMMARY OF THE INVENTION

The present invention is a system and method for assessing and monitoring student academic achievement levels for purposes of identifying students at risk for not meeting minimum academic standards or targets as measured using standardized tests, and for tracking or monitoring student academic performance levels.

The system and method of the present invention comprises producing a pool of curriculum-independent General Outcome Measures (GOMs) of substantially equal difficulty for a particular grade level, and further comprises a system and method of assessing and monitoring students in that grade level using the pool of GOMs for the purpose of identifying those students at risk for not meeting the minimum standardized test target scores and for tracking or monitoring student academic performance levels.

In the preferred embodiment, the system and method of the present invention is provided via an application service provider (ASP) to whose services authorized users subscribe. In the preferred embodiment, the system comprises a database or a plurality of databases accessible remotely by authorized users through a network and user interface. In the preferred system and method, the user interface is an Internet web site (hereinafter the "Site") that interfaces with and/or is integrated with the database.

The Site preferably comprises a secured main page comprising a plurality of sub-pages which provide the features and functionalities of the system, including the ability to input data into the database to monitor student academic performance levels and to generate reports thereon. The Site also preferably includes pages to monitor the performance level of at risk students using the GOMs and to generate reports thereon.

To the accomplishment of the above objectives, features and advantages, this invention may be embodied in the forms illustrated in the accompanying drawings, attention being called to the fact, however, that the drawings are illustrative only, and that changes may be made in the specific form illustrated and described without materially departing from the teachings herein.

BRIEF DESCRIPTION OF THE DRAWINGS

FIG. 4 is an example of a preferred main webpage for the preferred Site 58.

FIG. 5 is an example of a preferred "manage districts" page of the Site 58.

FIG. 6 is an example of a preferred "manage schools" page of the Site 58.

FIG. 7 is an example of a preferred "manage teachers" page of the Site 58.

FIG. 8 is also an example of a preferred "manage teachers" page of the Site 58 for designating a teacher as an authorized user 54.

FIG. 9 is an example of a preferred "manage students" page of the Site 58.

FIG. 10 is also an example of a preferred "manage students" page of the Site 58 for entering additional preferred student identifying information into the database.

FIG. 11 is an example of a preferred "manage classes" page of the Site 58.

FIG. 12 is an example of a preferred "manage roster" page of the Site 58.

FIG. 13 is an example of a preferred page of the Site 58 for entering a particular student's GOM test scores into the database.

FIG. 14 is an example of a preferred page of the Site 58 for entering a particular student's actual standardized test scores.

FIG. 22 is an example of a preferred Distribution by Sores and Percentile Table/Chart report.

FIGS. 24-28 is an example of a preferred "progress monitor" page of the Site 58.

DETAILED DESCRIPTION OF THE INVENTION

The system and method of the present invention comprises producing a plurality of standardized curriculum-independent General Outcome Measures (GOMs) of substantially equal difficulty for a particular grade level, then testing students using these GOMs for the purpose of identifying those students at risk for not meeting the minimum target scores on a standardized test for that particular grade level.

It is well known, particularly with respect to elementary grade students, that the more words per minute an elementary grade student can read correctly the more likely that student will perform well on a written comprehensive standardized test that tests not only reading skills, but also reading comprehension, writing, math and science. Conversely, the fewer words per minute that a student can read correctly from a passage, the less likely the student will perform well on such standardized tests. These general assumptions should be readily apparent, since if a student is unable to read well, he or she will likely have difficulty answering written questions on a standardized test within a limited time period.

Based on the foregoing, the applicants of the present invention have devised a system and method for assessing student academic achievement that is particularly well adapted for students in grades one through six using GOMs comprising Reading Assessment Passages (RAPs). However, it should be understood that the present invention is not limited to assessing students in grades one through six, nor should the present invention be understood as being limited to GOMs comprising RAPs. Rather, the present invention may be used for assessing students in preschool or kindergarten who have not yet learned to read by utilizing GOMs that test letter naming fluency, letter sound fluency; phonemic segmentation; initial sound. fluency and nonsense word fluency. Similarly, for middle and secondary school students, GOMs devised for assessing student aptitude of specific subject matters such as math and science may also be used. For example GOMs comprising mathematical fact tests may be utilized for assessing a student's likelihood for meeting minimal target scores for the math portion of a standardized test. Other specific subject-matter oriented GOMs may also be utilized.

The following disclosure of the preferred embodiment of the present invention specifically incorporates by reference the entirety of applicants' provisional application, Serial No. 60/350,198, and the ninety-nine page appendix attached thereto and forming a part thereof.

Figure 1:
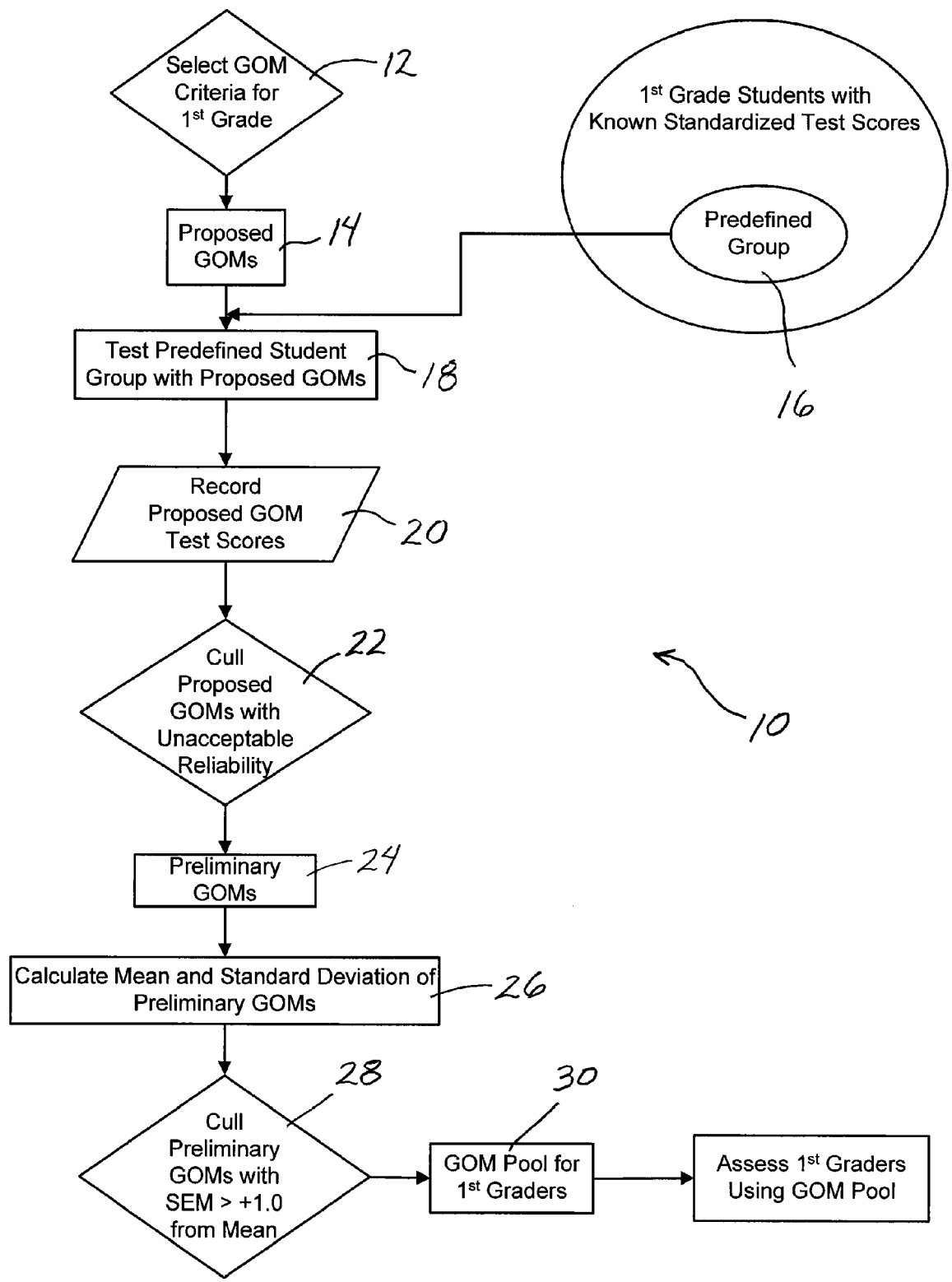
FIG. 1 is a flow-chart of a preferred method of the present invention for generating a pool of GOMs of substantial equal difficulty for a particular grade level.

FIG. 1 is a flow-chart of the preferred method 10 for preparing a pool of GOMs of substantially equal difficulty for use in assessing whether a student is likely to meet a minimum target score on a standardized test such as the Minnesota Comprehensive Assessment (MCA). By way of example only, FIG. 1 illustrates such a system and method for developing a pool of GOMs for first grade student. The preferred method 10 comprises first selecting criteria 12 for use in preparing the GOMs. If the GOM is to be a RAP, such criteria 12 may include defining appropriate subject matter, the number of words comprising each passage for a particular grade level, the number of syllables and sentences per one hundred words per grade as determined by the Fry (1968) readability formula, the use of proper names within the passages, and a requirement that the passage be story with a beginning and an ending. For first grade and second grade students, for example, a RAP may comprise 250 words with no words having more than two syllables. For third grade students, the RAP may comprise 300 words with no words having more than three syllables. For grades four through eight, for example, the RAPs may comprise 350 words, etc.

Once the GOM criteria 12 is selected, a plurality of proposed GOMs 14 are prepared using the selected criteria 12. With the proposed GOMs 14 prepared, a predefined test group 16 of students is selected to field-test 18 the proposed GOMs 14. In the present example of FIG. 1, the predefined test group 16 is drawn from of a pool of first grade students that have known test scores from a previously completed MCA standardized test. Preferably at least two of the students in the predefined test group 16 have MCA test scores in approximately the top 75th percentile of first grade students that took the MCA test, at least two first grade students with test scores in approximately the 50th percentile, and at least two first grade students with test scores in the bottom 25th percentile.

The process of field-testing the proposed GOMs is preferably performed by a trained examiner. In the preferred method in which the GOM is a RAP, the examiner preferably gives each student one minute to read each passage. The examiner preferably records the scores 20 of each of the student's from the predefined group 16 on each proposed GOM 14. For example, if the GOM is a RAP, the examiner would score the student by the number of words read correctly per minute, i.e. Correct Words Per Minute (CWPM) for each proposed RAP 14. The recorded proposed GOM test scores 20 (e.g., CWPM read) are then correlated to ensure the proposed passages are reliably of substantial equal difficulty. The process of correlation is preferably accomplished by calculating the reliability coefficient or correlation coefficient for each proposed GOM 14 tested on the predefined student group 16. The proposed GOMs 14 having a correlation coefficient less than a minimum acceptable correlation coefficient are then culled 22 or discarded as being unreliable, thereby resulting in a preliminary set of GOMs 24. In the preferred embodiment, the proposed GOMs having a correlation coefficient less than 0.7 are culled to arrive at the preliminary set of GOMs 24.

The mean score and standard deviations of the preliminary set of GOMs 24 are then calculated 26. In the preferred embodiment, those GOMs from the preliminary set of GOMs 24 having a standard error of measurement (SEM) greater than approximately +1.0 outside the mean score are culled 28. For example, if the GOM is a RAP and the mean CWPM is 125 and the SEM=11, then RAPs with a score of 137 CWPM or more, and RAPs with 113 CWPM or less, are preferably culled. The remaining GOMs comprise a pool of GOMs 30 are of substantially equal difficulty for a particular grade level, which in the present example, is first grade.

If the GOMs are RAPs, for example, further steps may be taken to ensure that the RAPs are grade-level appropriate. This is preferably accomplished by testing the remaining RAPs in the GOM/RAP pool 30 using Lexile scoring standards or other known readability formulas, including Dale-Chall, Flesh, Powers-Summer-Kearl, Spache, and Readability Calculations (1999) by Micro Power & Light Co. Those GOM/RAPS with Lexile scores outside a range acceptable for the particular grade level for which the pool of GOM/RAPs 30 are intended (which in the present example is first grade) are preferably culled resulting in a final grade-appropriate GOM/RAP pool of substantial equal difficulty.

The GOMs in the GOM pool 30 are then used in the method 40 as described hereinafter for assessing students in the grade level for which the GOM pool 30 was developed for purposes of identifying students at risk for not meeting minimal acceptable standardized test score or "target score" for that grade level as established by the state, the school district or the school.

Figure 2:
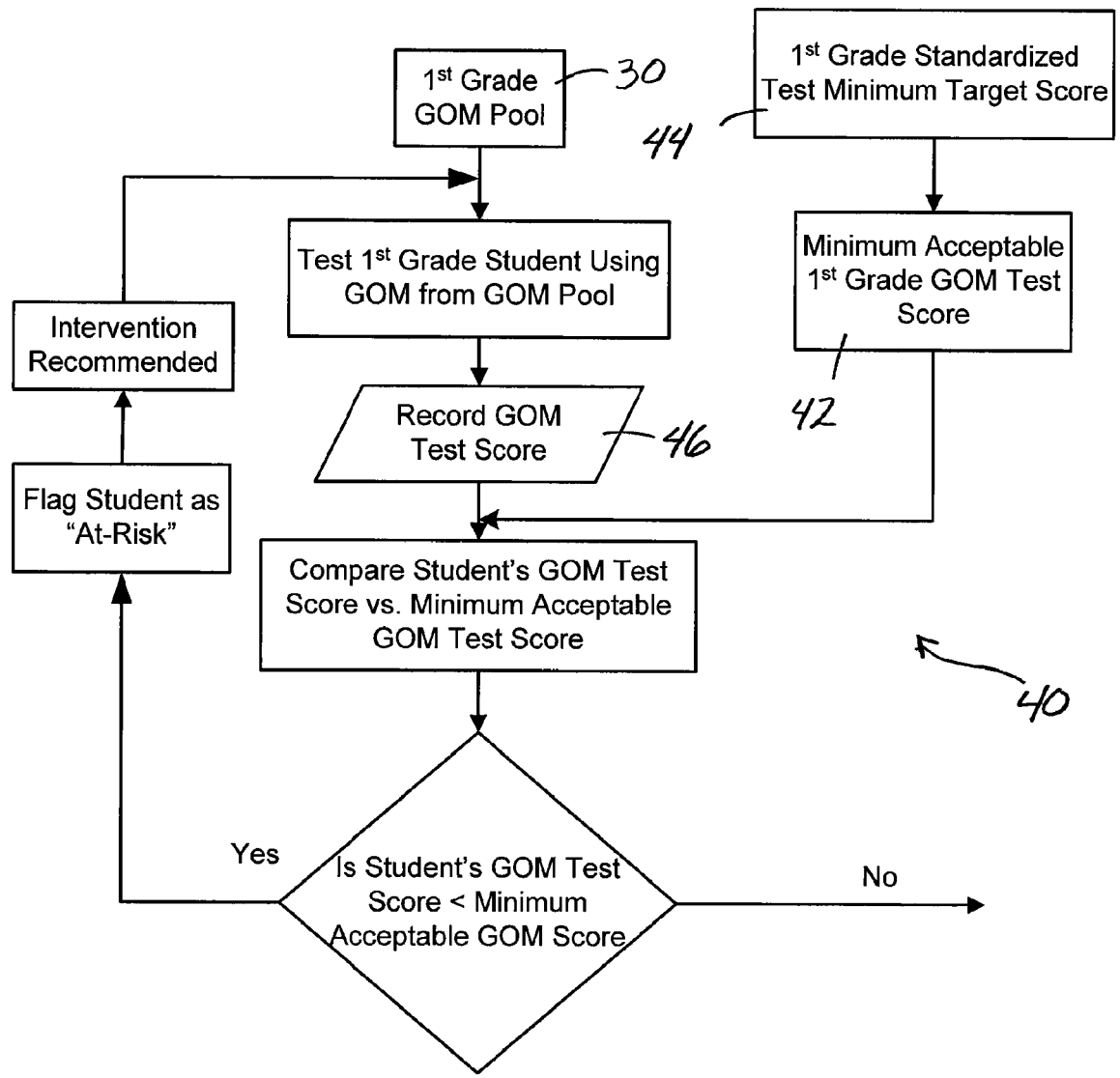
FIG. 2 is a flow-chart of a preferred method of the present invention for assessing and monitoring students to determine if they are at risk for not meeting a minimum standardized test target score.

The preferred method 40 of assessing and monitoring students using the GOM pool 30 for identifying students "at-risk" is illustrated in FIG. 2. Since the GOMs comprising the GOM pool 30 are reliably of substantial equal difficulty as a result of the foregoing method 10, one can estimate a minimum acceptable GOM test score 42 that has a strong probability of meeting the standardized test target score 44. Through an on-going process of testing multiple students using the GOM pool 30, one will continually acquire more data upon which to determine the minimum acceptable GOM test score 42 for predicting whether a student is at risk for not meeting the standardized test target score 44. Alternatively, as disclosed in the article by J. McIntosh, entitled *"Statistical Analysis of CWPM Scores vs. MCA Scores"* (2001) which forms apart of the appendix of applicant's provisional application 60/350,198 previously incorporated herein by reference, one can calculate a minimum acceptable GOM test score 42 based on a probability analysis.

Specifically, referring to FIG. 2, the preferred method 40 of assessing and monitoring students at risk comprises, testing each student in a grade level from a school using a first GOM from the GOM pool 30 developed for that particular grade level. In the present example of FIG. 2, the GOM pool 30 is for first graders. Each student's first GOM test score 46 is recorded and compared against a predetermined minimum acceptable GOM test score 42. If the student's first GOM test score 46 is less than the minimum acceptable GOM test score 42, the student is flagged as being "at-risk" and appropriate intervention may be taken, such as, providing additional instruction or tutoring for the student, or placing the student in a special program, etc. Once a student is identified as being "at-risk" the student is preferably monitored by repeated testing using a different GOM test each time drawn from the GOM pool 30. If a student's GOM test score 46 is greater than the minimum acceptable GOM test score 42, the student is not flagged as being at risk, that student need not be tested again, or may be tested less regularly than at-risk students.

Figure 3:
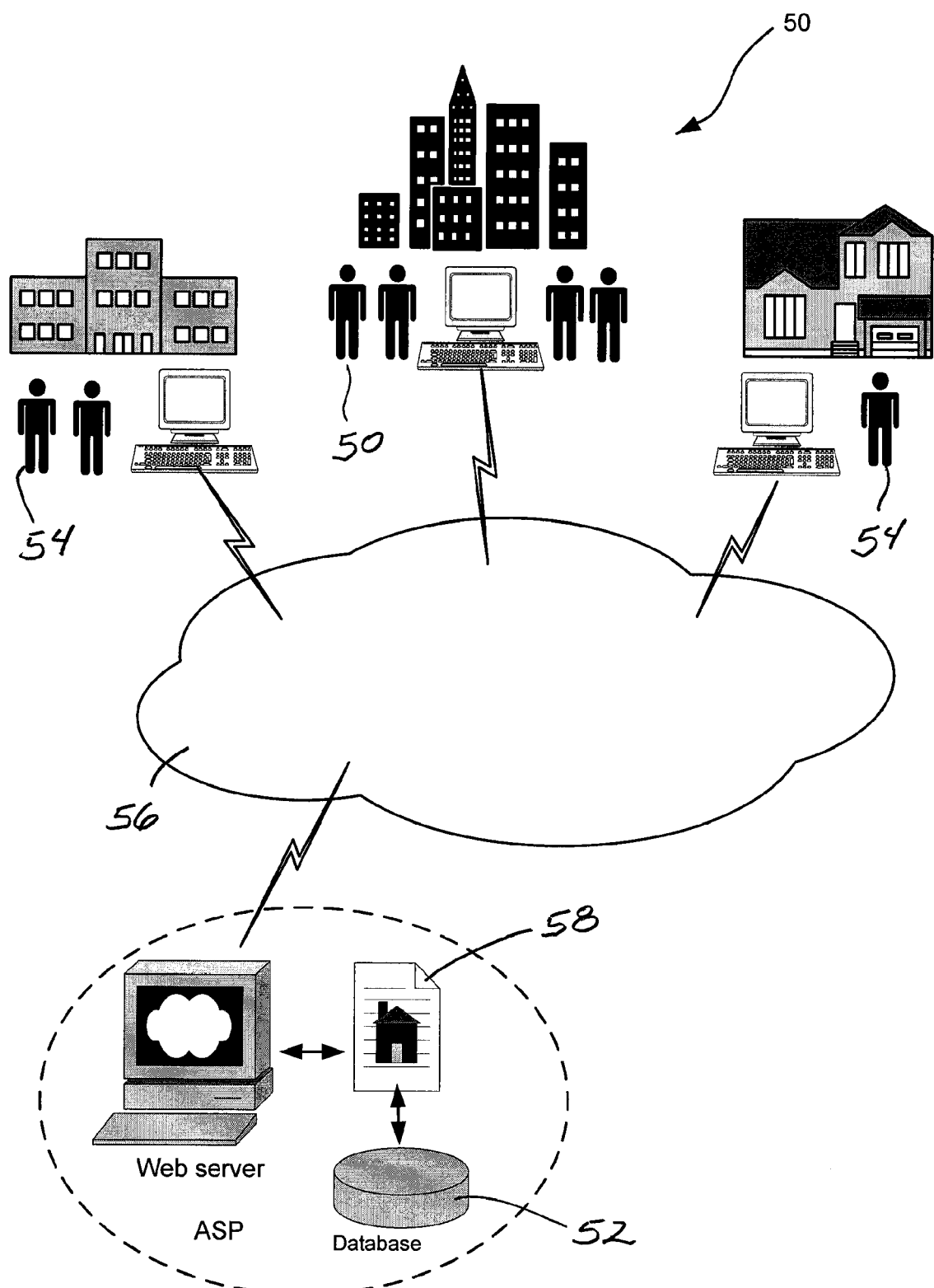
FIG. 3 is a schematic illustration of a preferred system for assessing and monitoring students using the preferred method 40 of FIG. 2.

FIG. 3 illustrates the preferred system and method 50 for monitoring student academic achievement levels using the methods 10 and 40 described above. The system and method 50 preferably comprises a database or a plurality of databases 52 accessible remotely by authorized users 54 through a network 56 and user interface 58. The network 56, may be a global public network such as the Internet, or any type public or private local area network (LAN) or wide area network (WAN). In the preferred system and method 50 of the present invention, the user interface 58 is an Internet web site (hereinafter the "Site") that interfaces with and/or is integrated with the database 52. In the preferred embodiment, the Site 58 and database 52 are preferably provided via an application service provider (ASP) to whose services authorized users 54 subscribe. As used herein the term "authorized user" 54 should be understood as meaning any public or private school, school district, or any other public or private organization or entity, or any individual within such an organization, such as a teacher, principle, superintendent, administrator or school board member, or any other individual, such as a parent, who may be interested in monitoring student academic achievement levels of an individual student, or for monitoring the school's or school district's academic achievement level on an aggregate basis.

The preferred user interface or Site 58 preferably utilizes web scripting/programming and server-side applications for performing the functions described in detail later. The Site 58 is preferably designed for viewing and interfacing through any conventional web-browser such as Microsoft Internet Explorer or Netscape Navigator. However, it should be understood that the system and method 50 of the present invention may comprise a stand-alone software application and database and therefore need not be networked or remotely accessible.

The database 52 may utilize any database application now known or later developed such as mySQL, Microsoft SQL Server, Oracle, Sybase, etc. Similarly, the web scripting/programming application may utilize any suitable language now known or later developed such as Java, PERL, PHP, Active Server Pages, Cold Fusion, HTML, etc. Similarly, the preferred server-side applications used for the system 50 may be any suitable application now known or later developed including content management systems, inference and recommendation engines and a plurality of other applications used to build dynamic web sites. The database 52 is preferably comprised of a number of predefined tables and each table having associated predefined data fields into which information can be entered through the Site 58 and/or displayed through the Site 58 as described in more detail later.

In use, a school or school district would first register by providing identifying information such as the school name, mailing address, telephone number and a contact person name and e-mail address. The contact person will typically be the person designated by the school to be the system administer. The system administrator, as an authorized user 54, is preferably required to select a username and password. Upon completing the registration process, the school or school district is preferably assigned a customer ID. The customer ID is preferably associated with each of the school's designated authorized users 54. To log into the Site 58, the authorized user 54 is preferably required to enter the school or district customer ID, and his or her username and password. Preferably, for security purposes, the username and password is required to be associated in the database 52 with the customer ID before user can obtain access to the Site 58. Upon logging in, the authorized user 54 preferably enters the main webpage 60 of the Site 58. Preferably, to protect the integrity of the information stored in the database 52, and to protect the privacy of the students, each authorized user 54 is assigned certain "access rights" by associating the user's username and password with particular access rights. For example, a school principle, district superintendent or school administrator for the system 50, may be given all access rights, whereas authorized teacher users 54 may be granted rights only for entering and viewing student data for their particular class or grade. Authorized parent users 54 may be granted rights only to view their child's data or to view data on an aggregate basis which does not identify students by name.

As illustrated in FIG. 4, the main page 60, preferably includes links for opening various other sub-pages of the site 58. One of the preferred sub-pages is a "manage districts" page 62, an example of which is illustrated in FIG. 5. Under the manage districts page 62, an authorized user 54 with appropriate access rights is able to enter various school districts into the database 52 and to add authorized users for those districts. Each added district is preferably assigned a unique identifier.

Another preferred sub-page is a "manage schools" page 64 as shown in FIG. 6. Under the manage schools page 64, an authorized user 54 with appropriate access rights is preferably able to add schools comprising each district into the database 52 and to add authorized users for each school. Additionally, under the manage schools page 64, the authorized user is able to add into the database 52 the grades served by each school. Each added school is preferably assigned a school unique identifier associated with the unique district identifier.

Another preferred sub-page is a "manage teachers" page 66 shown in FIG. 7. Under the manage teachers page 66, an authorized user 54 with appropriate access rights is preferably able to add teacher data for each school in a district into the database 52. Each teacher added is preferably assigned a unique teacher identifier associated with the school identifier which is in turn associated with the district identifier. As shown in FIG. 8, if the teacher is also to be an authorized user 54 of the system 50, the unique teacher identifier is associated with a username and password that the teacher can use, along with the customer ID, to log into the Site 58.

Another preferred sub-page is a "manage students" page 68 as shown in FIG. 9. Under the manage students page 68, an authorized user 54 with appropriate access rights is preferably able to add student data for each school in a district into the database 52. The student data preferably includes the student's name, gender, grade and date of birth. Other student identifying information which may be input through the manage students page 68 is identified in FIG. 10, and may include such demographic information as the student's ethnicity, meal status, and various other demographic information. Such demographic information may be desired for compliance with NCLB Act as described above or for other statistical analysis purposes.

Another preferred sub-page is a "manage classes" page 70 as illustrated in FIG. 11. Under the manage classes page 70, an authorized user 54 with appropriate access rights is able to associate in the database 52 the school's teachers for each class within a grade. Preferably each class is assigned a unique class identifier which is associated with a teacher identifier, which is in turn associated with the school identifier and district identifier.

Another preferred sub-page is a "manage roster" page 72 as illustrated in FIG. 12. Under the manage roster page 72, the previously entered students are associated in the database 52 with a particular class.

FIG. 13 is an example of preferred sub-page 74 for entering a particular student's GOM test scores 46 (or benchmark data). The student's GOM test scores 46 are associated in the database 52 with the student's unique identifier.

FIG. 14 is an example of a preferred page 76 for entering a particular student's actual standardized test scores. In the example of FIG. 14, the standardized test is the MCA test. Although not shown, the particular standardized test used by the school, or the district, or the state is preferably selectable from a list, or the name of the test can simply be input into the database 52. Additionally, an authorized user 54 with appropriate access rights can preferably select or input through one of the sub-pages of the Site 58, the standardized test's target scores 44 for each grade level as set by the school, the district or by the state. The standardized test used by each school and the standardized test target scores 44 for each grade are preferably associated in the database 52 with each school.

Figure 15:
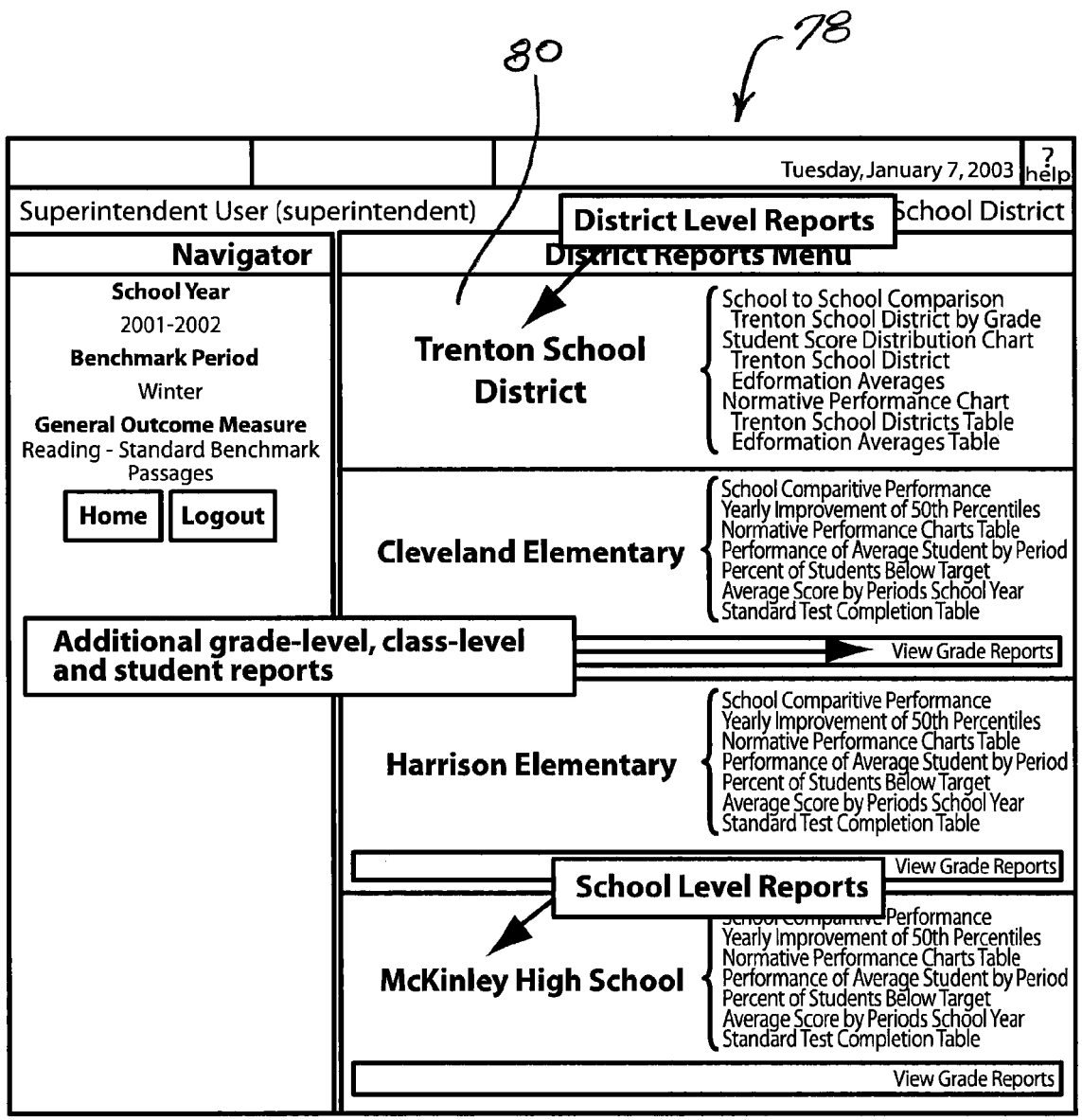
FIGS. 15-17 is an example of a preferred "reports" page of the Site 58.
Figure 16:
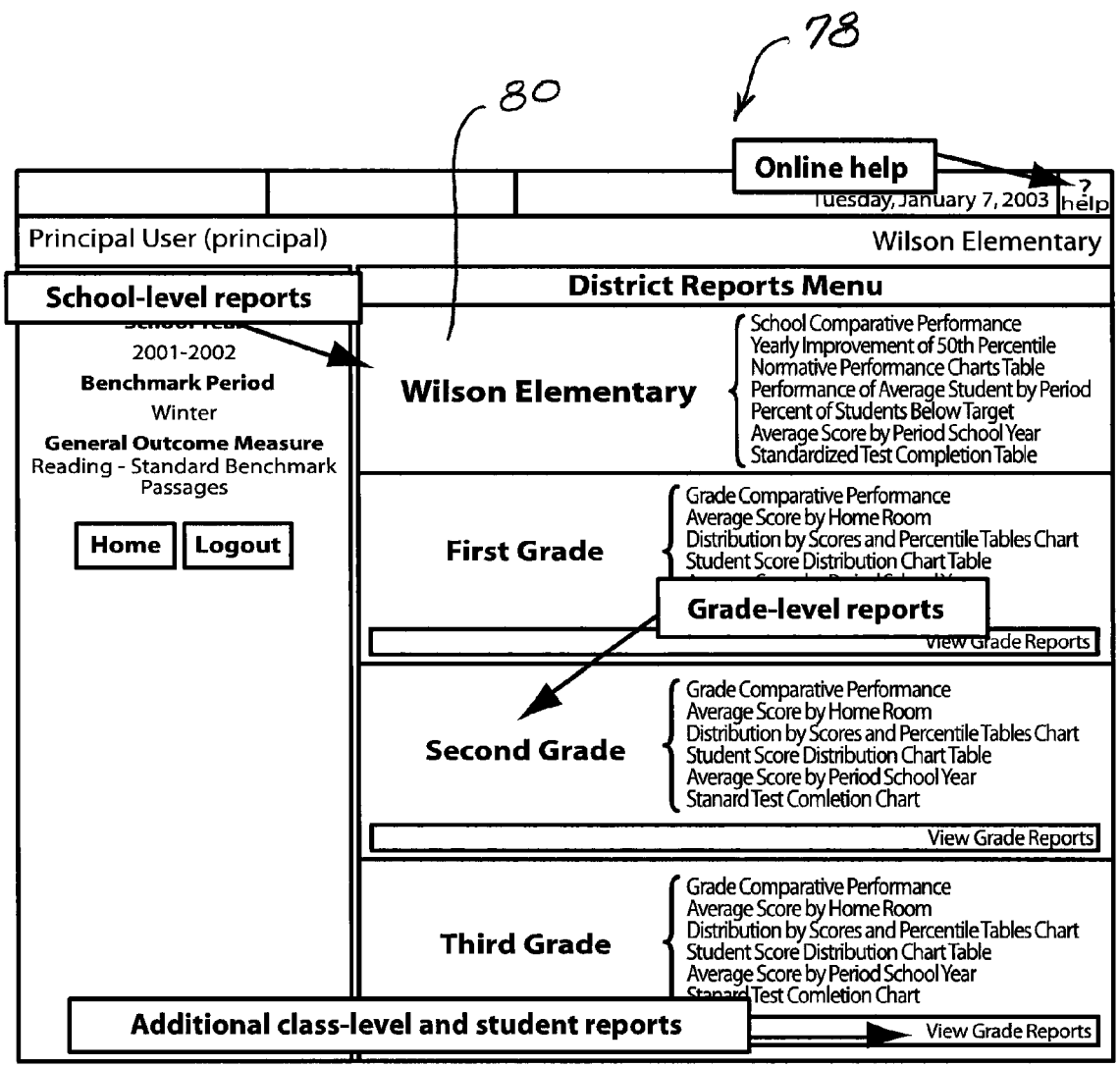
Figure 17:
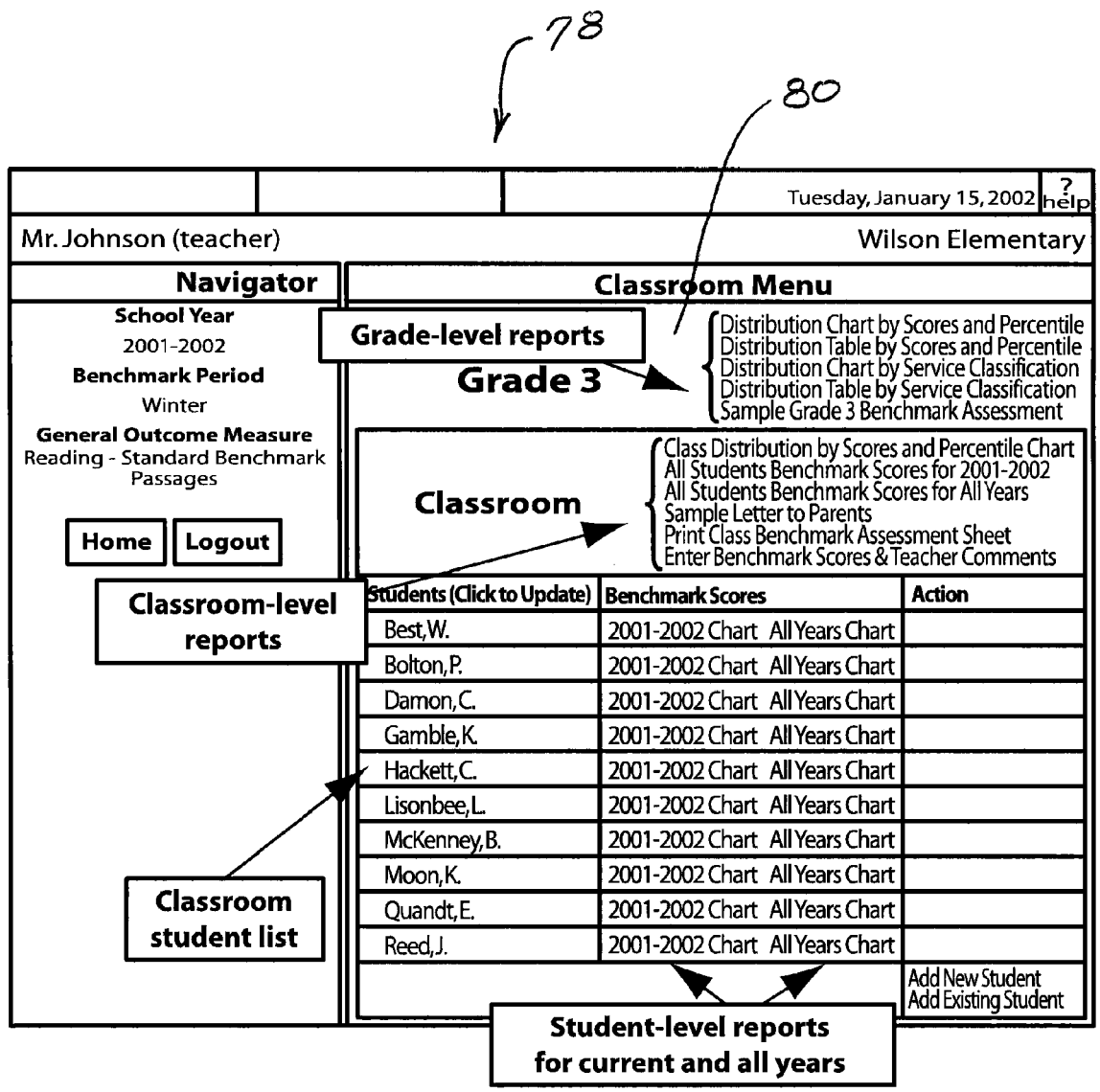
Figure 18:
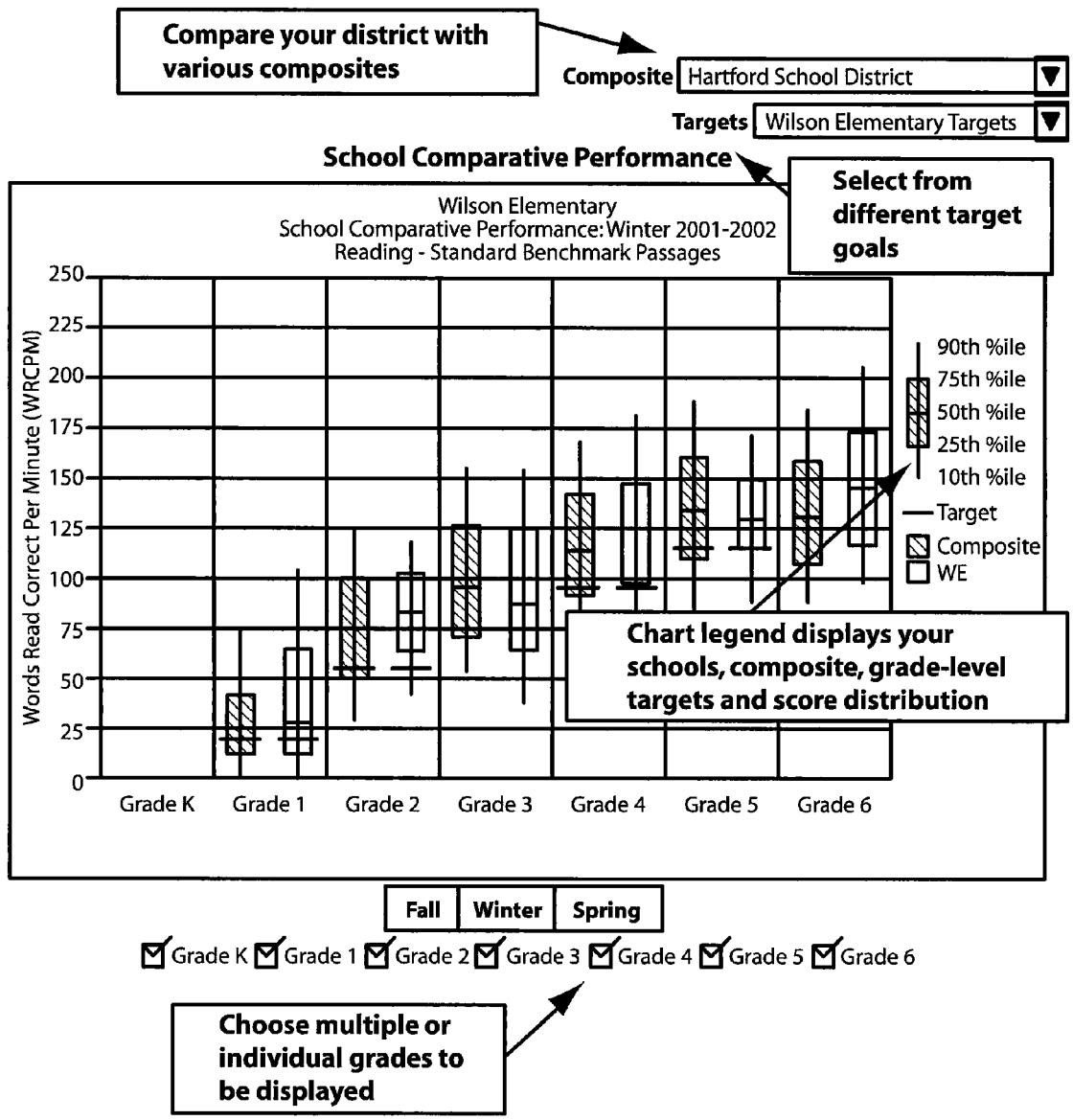
FIG. 18 is an example of a preferred School to School Comparison report.

Referring to FIGS. 15, 16 and 17, the Site 58 also preferably includes a "reports" page 78 which includes a reports menu 80 having a number of selectable report templates for generating reports at the district-level, at the school-level, at each grade-level, at each class-level and student-level reports. The district-level reports preferably include the following report templates: School to School Comparison; Student Score Distribution Chart; and Normative Performance Chart. FIG. 18 is an example of a preferred School to School Comparison Chart.

Figure 19:
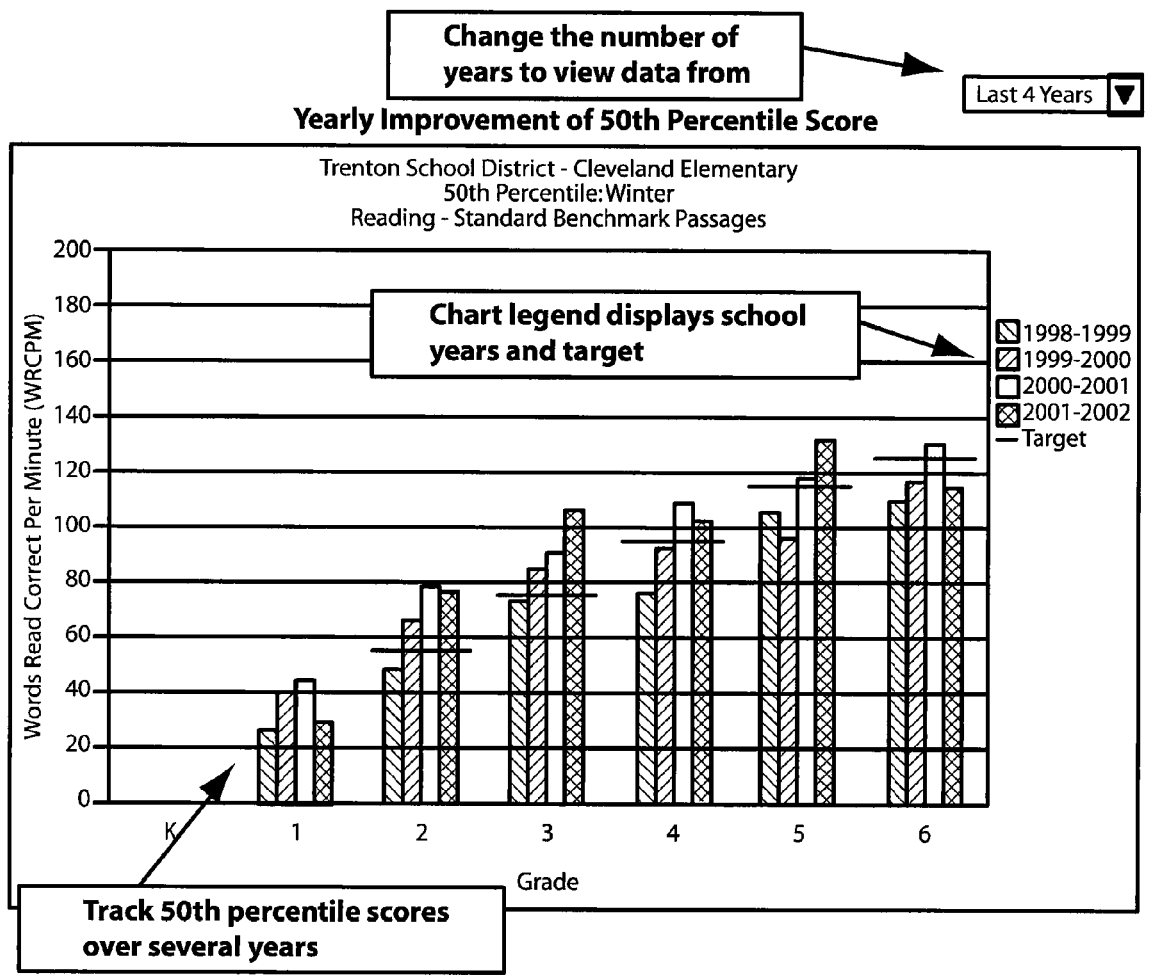
FIG. 19 is an example of a preferred Yearly Improvement of 50th Percentiles report.
Figure 20:
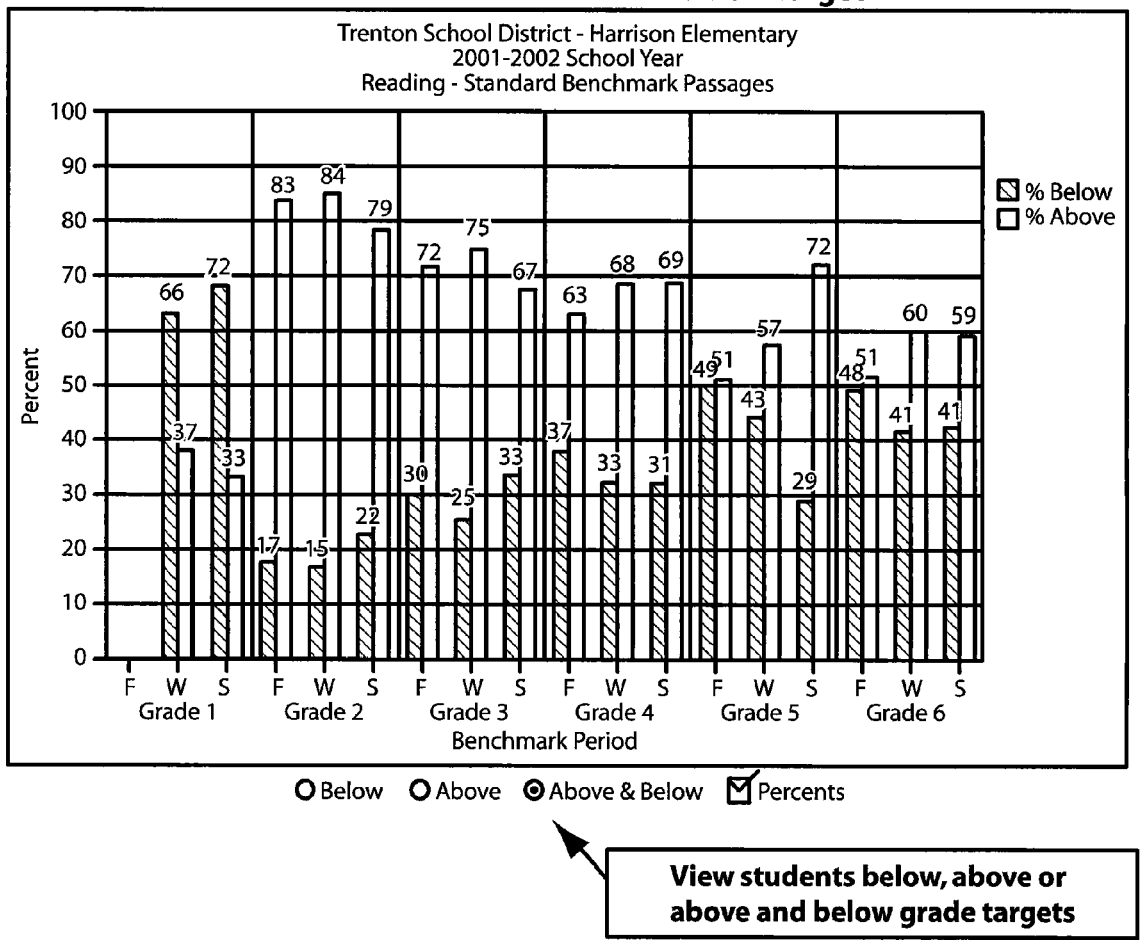
FIG. 20 is an example of a preferred Percent of Students Above/Below Target report.

The school-level reports preferably include the following report templates: School Comparative Performance; Yearly Improvement of 50th Percentiles; Normative Performance Chart/Table; Performance of Average Student by Period; Percent of Students Above/Below Target; Average Score by Period/School Year; Standard Test Correlation Table. FIG. 19 illustrates an example of a preferred Yearly Improvement of 50th Percentiles. FIG. 20 illustrates an example of a Percent of Students Above/Below Target report.

Figure 21:
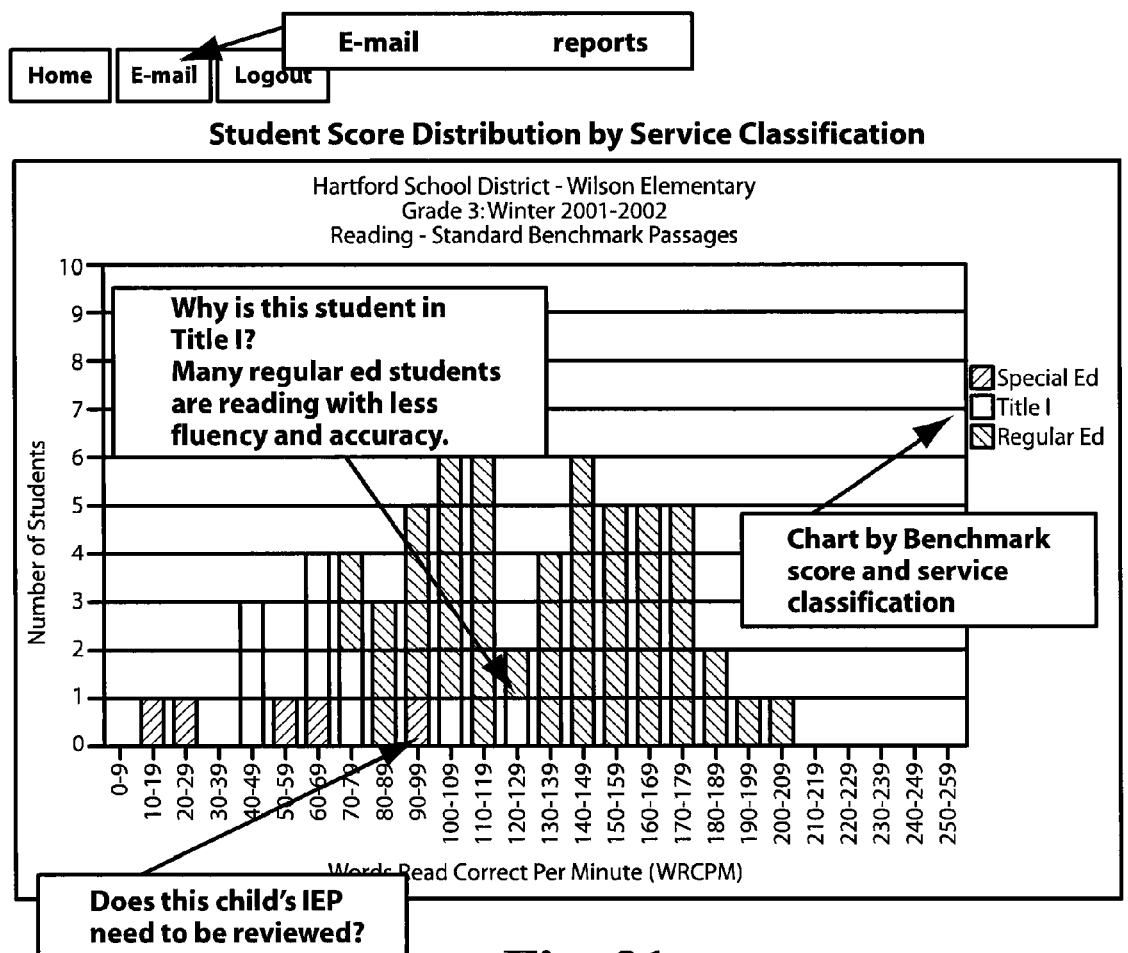
FIG. 21 is an example of a preferred Student Score Distribution Chart/Table report.

The grade-level reports preferably include the following report templates: Grade Comparative Performance; Average Score by Home Room; Distribution by Sores and Percentile Table/Chart; Student Score Distribution Chart/Table; Average Score by Period/School Year; and Standard Test Correlation Chart. FIG. 21 shows an example of a preferred Student Score Distribution Chart/Table. FIG. 22 is an example of a Distribution by Sores and Percentile Table/Chart.

The class-level reports preferably include the following report templates: Class Distribution by Scores and Percentiles Chart; All Students Benchmark (GOM) Scores by School Year; and All Students Benchmark (GOM) Scores for All Years.

Figure 23:
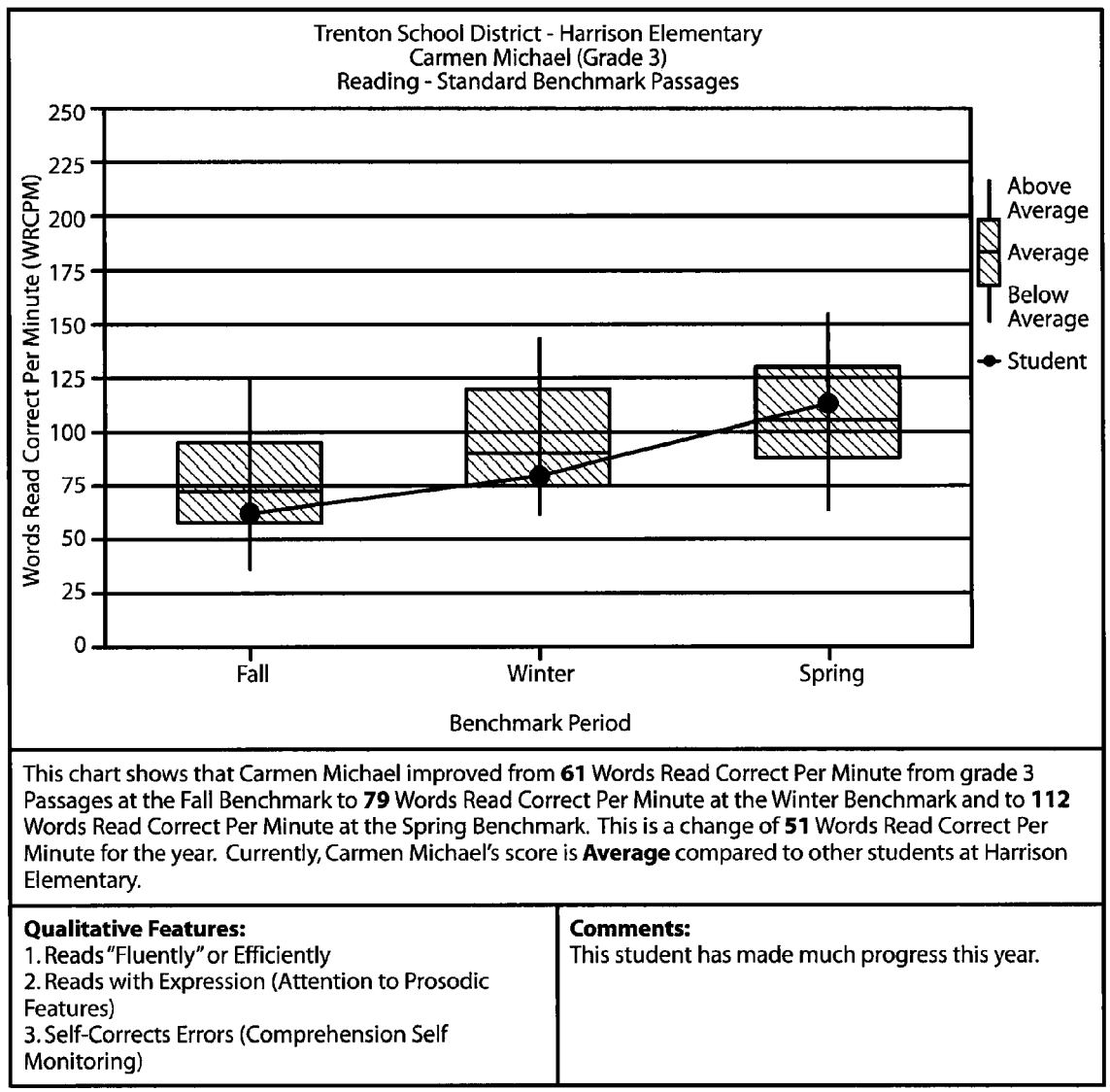
FIG. 23 is an example of a preferred Student's School Year Chart of Benchmark (GOM) Scores.

The student-level reports preferably include the following report templates: School Year Chart of Benchmark (GOM) Scores and Chart of Benchmark (GOM) Scores for All Years. FIG. 23 is an example of a Student's School Year Chart of Benchmark (GOM) Scores.

The reports are preferably generated by an authorized user 54 executing a database query based on a desired report template. For example, if a superintendent desired a School to School Comparison report of standardized test scores of two schools as shown in FIG. 18, the superintendent would select that report template. The report template preferably prompts the user to select the schools desired to be compared, the school grades desired and a desired time frame for comparison. Upon executing the database query report template, the server-side application retrieves from the appropriate database fields the standardized test scores for the students in the selected grades associated with the two schools by the school's unique identifiers. The server-side application then preferably generates a report based upon the report template. The server-side application preferably captures the report image, and transmits the captured image over the network 56 to the remote user where it is displayed by the Site 58 through the user's Internet browser.

Figure 29:
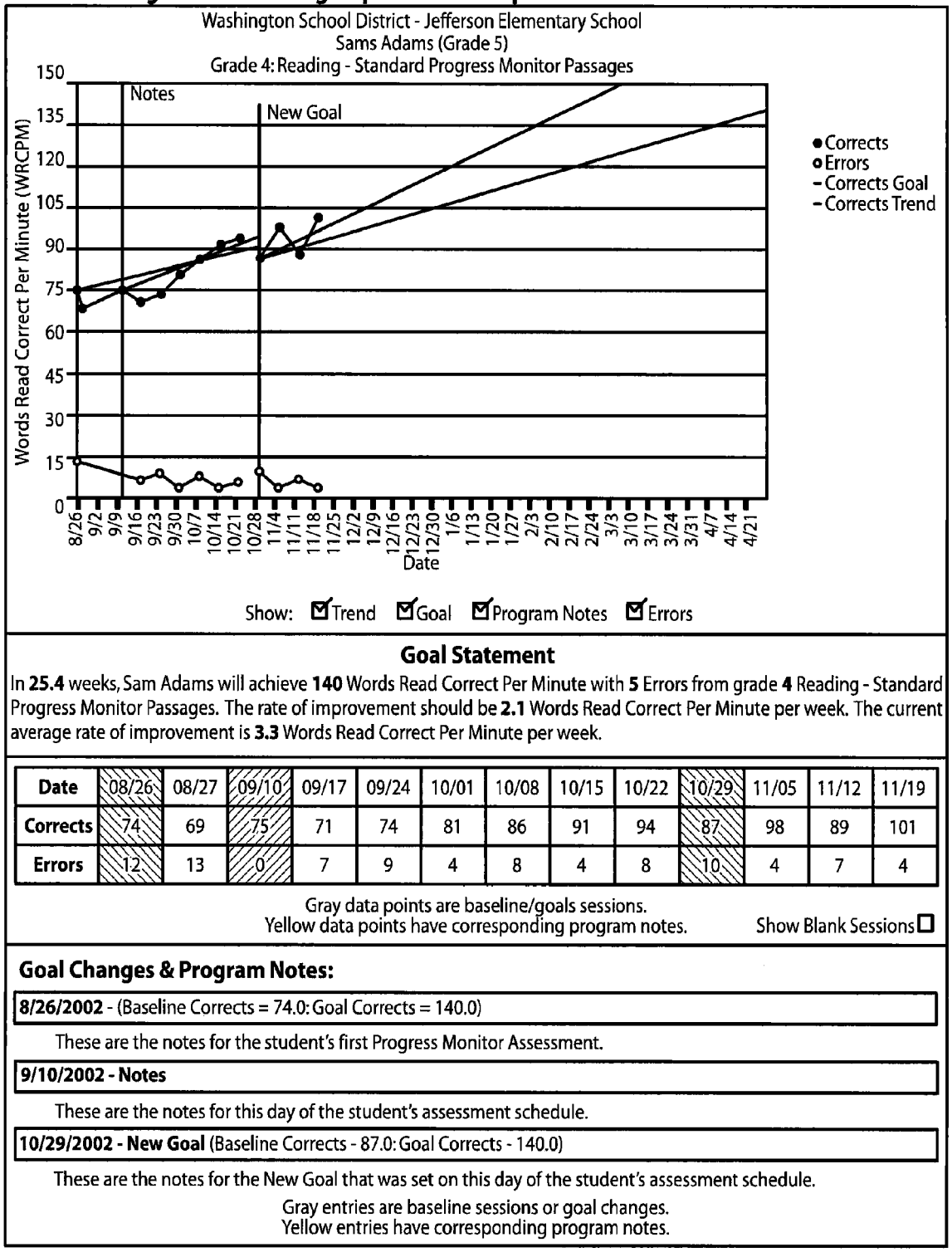
FIG. 29 is an example of a preferred report for viewing a student's GOM test scores.

The Site 58 also preferably includes a "progress monitor" page 90 as shown in FIGS. 24-28 which allows an authorized user 54 with appropriate access rights to set assessment schedules for at risk students, as well as to track the students'GOM scores 46, and to set goals for the students. Additionally, as shown in FIG. 29, the progress monitor page 90 also preferably allows the authorized user to graphically chart each student's GOM test scores 46. As with the previous reports, the user selects a GOM test score progress report template for the desired student. Within the template, the user is preferably prompted to enter the students name and a desired time frame for the report. Upon executing the database query report template, the requested GOM test scores 46 associated with the students name through the unique student identifier are retrieved from the appropriate database fields and a report is generated, captured, transmitted and displayed by the Site 58 through the remote user's Internet browser.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A method of producing a plurality of standardized academic curriculum-independent General Outcome Measures (GOMs) of substantially equal difficulty for a particular academic grade level for use in identifying students at risk for not meeting minimum target scores on an academic standardized test for the particular academic grade level, said method comprising the steps of:
   (A) selecting a set of criteria for use in preparing standardized curriculum-independent GOMs for a particular academic grade level;
   (B) preparing a plurality of proposed GOMs using said selected criteria;
   (C) selecting a plurality of students in said particular academic grade level satisfying a predefined test group, each of said students of said predefined test group having known test scores from a previously completed standardized test with a known minimum target score;
   (D) testing each of said plurality of students from said predefined test group with said plurality of proposed GOMs and recording each of said student's GOM test scores for each of said proposed GOMs;
   (E) culling those GOMs from said plurality of proposed GOMs tested having significant disparity of test scores by student of said predefined test group, thereby resulting in a preliminary set of GOMs;
   (F) calculating a mean score and a standard deviation of said preliminary set of GOMs;
   (G) culling those GOMs from said preliminary set of GOMs having a standard error of measurement greater than approximately +1.0 outside said mean score thereby resulting in a pool of GOMs;
   whereby said resulting pool of GOMs are of substantially equal difficulty and ready for use in a student academic assessment program for identifying at-risk students.

2. The method of claim 1 wherein said step (B) includes:
   calculating a mean reliability coefficient for each said proposed GOM tested; and
   culling those proposed GOMs tested having a correlation coefficient less than a predetermined minimum acceptable correlation coefficient.

3. The method of claim 2 wherein said predetermined minimal acceptable correlation coefficient is greater than about 0.7.

4. The method of claim 3, wherein said GOMs comprise reading assessment passages (RAPs).

5. The method of claim 4 wherein said step (A) includes identifying by academic grade level the number of words comprising each of said RAPs; and identifying by grade level the number of syllables and sentences per 100 words for each of said RAPs as determined by the Fry (1968) readability formula.

6. The method of claim 5 further comprising the step of:
   scoring said RAPs from said pool of GOMs using Lexile scoring standards; and
   culling said RAPs from said pool of GOMs having Lexile scores outside a range acceptable for said particular academic grade as determined using said Lexile scoring standards.

7. The method of claim 2 wherein said step (C) includes selecting at least two students in said particular grade level having standardized test scores in approximately the 75th percentile, at least two students in said particular academic grade level having standardized test scores in approximately the 50th percentile and at least two students in said particular grade having standardized test scores in approximately the 25th percentile.

8. The method of claim 2, wherein said GOMs comprise letter naming fluency tests.

9. The method of claim 2, wherein said GOMs comprise letter sound fluency tests.

10. The method of claim 2, wherein said GOMs comprise phonemic segmentation tests.

11. The method of claim 2, wherein said GOMs comprise nonsense word fluency tests.

12. The method of claim 2, wherein said GOMs comprise mathematical fact tests.

13. The method of claim 2, wherein said GOMs comprise initial sounds fluency tests.

14. A method of assessing students at risk for not meeting a target score on an academic standardized test for a particular academic grade level, said method comprising the steps of:
   (a) providing a first GOM from a pool of GOMs, said pool of GOMs meeting a minimal acceptable preestablished correlation coefficient for a particular academic grade level, and wherein the academic standardized test has a known target score for said academic grade level;

(b) calculating a minimal acceptable GOM test score based on a probability of at least approximately a seventy percent chance of meeting the academic standardized test target score;

(c) testing a student using said first GOM;

(d) recording said student's score from said first GOM test;

(e) comparing said student's first GOM test score to said calculated minimal acceptable GOM test score;

(f) flagging said student as being at risk if said student's first GOM test score is below said minimal acceptable GOM test score.

15. The method of claim 14 wherein said pool of GOMs are developed using the method comprising the steps of:

(A) selecting a set of criteria for use in preparing GOMs for a particular academic grade level;

(B) preparing a plurality of proposed GOMs using said selected criteria;

(C) selecting a plurality of students in said particular grade level satisfying a predefined test group, each of said students of said predefined test group having known test scores from a previously completed standardized test with a known minimum target score;

(D) testing each of said plurality of students from said predefined test group with said plurality of proposed GOMs and recording each of said student's GOM test scores for each of said proposed GOMs;

(E) culling those GOMs from said plurality of proposed GOMs tested having significant disparity of test scores by student of said predefined test group, thereby resulting in a preliminary set of GOMs;

(F) calculating a mean score and a standard deviation of said preliminary set of GOMs;

(G) culling those GOMs from said preliminary set of GOMs having a standard error of measurement greater than approximately +1.0 outside said mean score thereby resulting in a pool of GOMs;

whereby said resulting pool of GOMs are of substantially equal difficulty and ready for use in a student academic assessment program for identifying at-risk students.

16. The method of claim 15 wherein said step (E) includes:

calculating a mean reliability coefficient for each said proposed GOM tested; and culling those proposed GOMs tested having a correlation coefficient less than a predetermined minimum acceptable correlation coefficient.

17. The method of claim 16 wherein said predetermined minimal acceptable correlation coefficient is at least approximately 0.7.

18. The method of claim 17, wherein said GOMs comprise reading assessment passages (RAPs).

19. The method of claim 18 wherein said step (A) includes identifying by academic grade level the number of words comprising each of said RAPs; and identifying by academic grade level the number of syllables and sentences per 100 words for each of said RAPs as determined by the Fry (1968) readability formula.

20. The method of claim 19 further comprising the step of:

scoring said RAPs from said pool of GOMs using Lexile scoring standards; and culling said RAPs from said pool of GOMs having Lexile scores outside a range acceptable for said particular academic grade as determined using said Lexile scoring standards.

21. The method of claim 15 wherein said step (C) includes selecting at least two students in said particular academic grade level having standardized test scores in approximately the 75th percentile, at least two students in said particular grade level having standardized test scores in approximately the 50th percentile and at least two students in said particular grade having standardized test scores in approximately the 25th percentile.

22. The method of claim 15, wherein said GOM comprises a letter naming fluency test.

23. The method of claim 15, wherein said GOMs comprise letter sound fluency tests.

24. The method of claim 15, wherein said GOMs comprise phonemic segmentation tests.

25. The method of claim 15, wherein said GOMs comprise nonsense word fluency tests.

26. The method of claim 15, wherein said GOMs comprise mathematical fact tests.

27. The method of claim 15, wherein said GOMs comprise initial sounds fluency tests.

28. A method of monitoring students at risk for not meeting a target score on a standardized test for a particular academic grade level, said method comprising the steps of:

(a) providing a pool of GOMs for a particular grade level, said pool of GOMs having a minimum preestablished correlation coefficient for said particular academic grade level, wherein the standardized test has a known target score for said academic grade level;

(b) calculating a minimal acceptable GOM test score for said academic grade level based on a probability of at least approximately a seventy percent chance of meeting the standardized test target score for said academic grade level;

(c) testing a student at a first point in time using a first GOM from said pool of GOMs;

(d) recording said student's first GOM test score from said first GOM test;

(e) reporting said student's first GOM test score at said first point in time versus said minimal acceptable GOM test score.

(f) flagging said student as being at risk if said student's first GOM test score is below said minimal acceptable GOM test score;

(g) testing a student at a second point in time using a second GOM from said pool of GOMs;

(h) recording said student's second GOM test score from said second GOM test;

(i) reporting said student's second GOM test score at said second point in time versus said student's first GOM test score at said first point in time as compared to said minimal acceptable GOM test score.

29. The method of claim 28 wherein said pool of GOMs are developed using the method comprising the steps of:

(A) selecting a set of criteria for use in preparing GOMs for a particular academic grade level;

(B) preparing a plurality of proposed GOMs using said selected criteria;

(C) selecting a plurality of students in said particular grade level satisfying a predefined test group, each of said students of said predefined test group having known test scores from a previously completed standardized test with a known minimum target score;

(D) testing each of said plurality of students from said predefined test group with said plurality of proposed GOMs and recording each of said student's GOM test scores for each of said proposed GOMs;

(E) culling those GOMs from said plurality of proposed GOMs tested having significant disparity of test scores by student of said predefined test group, thereby resulting in a preliminary set of GOMs;

(F) calculating a mean score and a standard deviation of said preliminary set of GOMs;

(G) culling those GOMs from said preliminary set of GOMs having a standard error of measurement greater than approximately +1.0 outside said mean score thereby resulting in a pool of GOMs;

whereby said resulting pool of GOMs are of substantially equal difficulty and ready for use in a student academic assessment program for identifying at-risk students.

30. The method of claim 29 wherein said step (E) includes:
calculating a mean reliability coefficient for each said proposed GOM tested; and
culling those proposed GOMs tested having a correlation coefficient less than a predetermined minimum acceptable correlation coefficient.

31. The method of claim 30 wherein said predetermined minimal acceptable correlation coefficient is at least approximately 0.7.

32. The method of claim 31 wherein said step (C) includes selecting at least two students in said particular academic grade level having standardized test scores in approximately the 75th percentile, at least two students in said particular academic grade level having standardized test scores in approximately the 50th percentile and at least two students in said particular academic grade having standardized test scores in approximately the 25th percentile.

33. The method of claim 31, wherein said GOMs comprise reading assessment passages (RAPs).

34. The method of claim 33 wherein said step (A) includes identifying by academic grade level the number of words comprising each of said RAPs, and identifying by grade level the number of syllables and sentences per 100 words for each of said RAPs as determined by the Fry (1968) readability formula.

35. The method of claim 34 further comprising the step of:
scoring said RAPs from said pool of GOMs using Lexile scoring standards; and
culling said RAPs from said pool of Lexile scored GOMs having Lexile scores outside a range acceptable for said particular academic grade as determined using said Lexile scoring standards.

36. The method of claim 29, wherein said GOMs comprise letter naming fluency tests.

37. The method of claim 29, wherein said GOMs comprise letter sound fluency tests.

38. The method of claim 29, wherein said GOMs comprise phonemic segmentation tests.

39. The method of claim 29, wherein said GOMs comprise nonsense word fluency tests.

40. The method of claim 29, wherein said GOMs comprise mathematical fact tests.

41. The method of claim 29, wherein said GOMs comprise initial sounds fluency tests.

42. The method of claim 28 further comprising the steps of:
(j) providing a database accessible to authorized users via a network through a user interface;
(k) using said user interface to remotely input a student's identifying information including said student's school identifier and grade level into said database;
(m) using said user interface to remotely input said standardized test target score for said grade level into said database and associating said standardized test target score for said academic grade level with said student's academic grade level; and wherein said steps (d) and (h) of recording said student's first and second GOM test scores includes inputting said student's first and second GOM test scores into said database using said user interface and associating said student's first and second GOM test scores with said student's identifying information.

43. The method of claim 42 wherein said step (e) of reporting said student's first GOM test score versus said calculated minimal acceptable GOM test score for said academic grade level includes:
remotely executing a database query using said user interface wherein said database query comprises said student's grade level and at least one other element of said student's identifying information to selectively retrieve said student's first GOM test score and said minimal acceptable GOM test score for said academic grade level from said database;
displaying said selectively retrieved student's first GOM test score versus said selectively retrieved minimal acceptable GOM test score through said user interface on a remote display.

44. The method of claim 43 wherein said step (i) or reporting said student's second GOM test score at said second point in time versus said student's first GOM test score at said first point in time as compared to said minimal acceptable GOM test score for said academic grade level includes:
remotely executing a database query using said user interface wherein said database query comprises said student's academic grade level and at least one other element of said student's identifying information to selectively retrieve said student's first and second GOM test scores and said minimal acceptable GOM test score for said academic grade level from said database;
displaying said selectively retrieved student's first and second GOM test scores versus said selectively retrieved minimal acceptable GOM test score through said user interface on said remote display.

45. The method of claim 42 further comprising:
(n) reporting at least one of said student's first and second GOM test scores at a desired point in time against inputted GOM test scores of other students of said school in said academic grade level versus said calculated minimal acceptable GOM test score for said academic grade level.

46. The method of claim 45 wherein said step (n) comprises:
remotely executing a database query using said user interface wherein said database query comprises said school identifier and said desired point in time to selectively retrieve said GOM test scores of said students of said school for said academic grade level and said minimal acceptable GOM test score for said academic grade level from said database;
displaying said selectively retrieved GOM test scores of said students of said school for said academic grade level versus said selectively retrieved minimal acceptable GOM test score for said academic grade level through said user interface on a remote display.

47. The method of claim 46 further comprising:
(o) using said user interface to remotely input said student's teachers and associating said student's teachers with said student's GOM test scores.

48. The method of claim 47 further comprising:
(p) reporting said student's GOM test scores by said student's teachers.

49. The method of claim 48 wherein said step (p) comprises:
remotely executing a database query using said user interface wherein said database query comprises a teacher identifier associated with said teacher and said desired point in time to selectively retrieve said GOM test scores of said teacher's students and said minimal acceptable GOM test score for said academic grade level from said database;
displaying said selectively retrieved GOM test scores of said teacher's students versus said selectively retrieved minimal acceptable GOM test score for said academic grade level through said user interface on a remote display.

50. The method of claim 49 further comprising:
(q) reporting student GOM test scores by academic grade level for a school.

51. The method of claim 50 wherein said step (q) comprises:
remotely executing a database query using said user interface wherein said database query comprises a school identifier associated with GOM test scores of students for said particular academic grade level from said school and said desired point in time to selectively retrieve said GOM test scores of said school's students and said minimal acceptable GOM test score for said academic grade level from said database;
displaying said selectively retrieved student GOM test scores by academic grade level for said school versus said selectively retrieved minimal acceptable GOM test score for said academic grade level through said user interface on a remote display.

52. A method of monitoring student academic achievement levels, said method comprising the steps of:
(a) providing a database accessible to authorized users via a network through a user interface;
(b) using said user interface to remotely input a student's identifying information including said student's school identifier and grade level into said database;
(c) using said user interface to remotely input standardized test target scores for said academic grade level into said database and associating said academic standardized test target score for said grade level with said student's academic grade level;
(d) using said user interface to remotely input said students standardized test scores and associating said student's academic standardized test scores with said student's identifying information;
(e) remotely viewing on a remote display said student's academic standardized test scores versus said academic standardized test target scores for said academic grade level by remotely executing a database query using said user interface to selectively retrieve from said database said student's academic standardized test scores associated with said student's unique identifier and to selectively retrieve said academic standardized test target scores associated with said academic grade level;
(f) displaying said selectively retrieved student's standardized test scores versus said selectively retrieved standardized test target scores for said academic grade level through said user interface on said remote display.

53. The method of claim 52 further comprising remotely viewing on a remote display standardized test scores of same-grade students by school versus said standardized test target scores for said academic grade level by remotely executing a database query using said user interface to selectively retrieve from said database said students' standardized test scores associated with said school's unique identifier and said academic grade and to selectively retrieve said standardized test target scores associated with said academic grade;
displaying said selectively retrieved students' standardized test scores of said same-grade students by school versus said selectively retrieved standardized test target scores through said user interface on said remote display.

54. The method of claim 52 further comprising remotely viewing on a remote display student standardized test scores by teacher versus said standardize test target scores for said teacher's academic grade level by remotely executing a database query using said user interface to selectively retrieve from said database all said student standardized test scores associated with said teacher's unique identifier and to selectively retrieve said standardized test target scores associated with said academic grade;
displaying said selectively retrieved students' standardized test scores associated with said teacher versus said selectively retrieved standardized test target scores through said user interface on said remote display.

* * * * *

UNITED STATES PATENT AND TRADEMARK OFFICE
CERTIFICATE OF CORRECTION

PATENT NO. : 7,311,524 B2 Page 1 of 1
APPLICATION NO. : 10/346941
DATED : December 25, 2007
INVENTOR(S) : Steven R. Jennen and Gary A. Germann It is certified that error appears in the above-identified patent and that said Letters Patent is hereby corrected as shown below:

Claim 2; col. 12 line 12, replace "(B)" with -- (E) --.

Signed and Sealed this

Twenty-ninth Day of April, 2008

JON W. DUDAS
*Director of the United States Patent and Trademark Office*